ically, if the composition is a paving grade bitumen, it should have a penetration at 25°C of at least 100. An oxidised high boiling hydrocarbon oil may be used in place of the high boiling oil and un-blown bitumen, but a lower softening point is usually obtained. Preferably the high boiling oil is non-oxidised.

United States Patent [19]
Oelsner et al.

[11] 3,873,483

[45] Mar. 25, 1975

[54] ASPHALTIC COMPOSITION CONTAINING ELASTIC COPOLYMERS

[75] Inventors: Manfred Wolfgang Oelsner, Hamburg; Erich Günther Zenke, Halstenbek, both of Germany

[73] Assignee: The British Petroleum Company Limited, London, England

[22] Filed: Aug. 8, 1973

[21] Appl. No.: 386,778

[30] Foreign Application Priority Data
Sept. 19, 1972 Germany............................ 2245962

[52] U.S. Cl. ................. 260/28.5 AS, 260/33.6 AQ
[51] Int. Cl. ............................................. C08f 45/52
[58] Field of Search............ 260/28.5 AS, 33.6 AQ; 208/44

[56] References Cited
UNITED STATES PATENTS 2,909,498  10/1959  Sayko .......................... 260/28.5 AS
3,540,906  11/1970  Fauber ......................... 260/28.5 AS
3,700,615  10/1972  Scott ........................... 260/33.6 AQ Primary Examiner—Harry Wong, Jr.
Assistant Examiner—S. L. Fox
Attorney, Agent, or Firm—Morgan, Finnegan, Durham & Pine

[57] ABSTRACT

Bituminous composition is prepared by blowing a mixture of 65–95% by weight of a high boiling hydrocarbon oil and 35–5% of an elastomeric copolymer, preferably an ethylene-propylene-dicyclopentadiene copolymer. The blown mixture is then blended with un-blown bitumen and the resulting mixture can be further blown if desired. The products have good hot storage properties.

16 Claims, No Drawings

ASPHALTIC COMPOSITION CONTAINING ELASTIC COPOLYMERS

This invention relates to a process for the preparation of a bituminous composition, in particular, a bituminous composition suitable for use as a paving grade bitumen. The terms "bituminous composition," "bituminous material" and "bitumen," as used in the specification, shall be understood to have the meaning "asphaltic composition," "asphaltic material" and "asphalt," respectively, in accordance with the definition ASTMD8-55 established for "asphalt" by the American Society for Testing Materials.

In bituminous roads, the top layer is stressed to the greatest extent because it is directly exposed to the full traffic load whereas leaser pressures are exerted on the deeper layers because of the load distributing effect. Moreover, the unprotected upper layer is most affected by temperature since extreme summer and winter temperatures are encountered here. Thermally dependant tensile and compressive stresses of the daily change in temperature are most marked here, too. Furthermore, wear stresses caused by moving traffic are most marked in the bituminous surface. Similar but lower stresses affect the layers immediately beneath the top layer.

The above mentioned stresses of the upper bituminous layers must be largely absorbed by the binder of the asphalt mix. Due to the thermoplastic character of conventional bituminous binders, stresses are most critical at low temperatures, high axle loads, high traffic frequencies and high traffic speeds.

For highly stressed asphalt roads, in particular for top surfaces under critical climatic and/or traffic conditions, a modified bituminous binder is therefore desired which shows low embrittlement at low temperatures and flexible behaviour under dynamic loads over a broad temperature range.

To ensure processibility under conditions usually encountered in asphalt mixing plants, the high temperature viscosity characteristics of such modified binders must be comparable with those of conventional commercial binders, i.e., they should possess approximately the same viscosity at processing temperatures.

It is known that bituminous binders with improved elastic properties can be obtained by adding natural rubber; however, the thermal stability of such mixtures is not sufficient to ensure that the full elastic properties of the modified binders are obtained under temperatures encountered during hot tank storage of the binders and during the hot mixing process in the asphalt mixing plant.

It has also been proposed on many occasions to add synthetic elastomers to bituminous binders. The resulting compositions suffer from the same defects and, in addition, it is also possible for the bitumen and rubber to separate during hot storage.

It is also known that improved flexibility and lesser temperature susceptibility of paving bitumen consistency can be obtained by increasing the bitumen gel structure by oxidation with air, which results in an increase in the penetration index. However, only a comparatively low elasticity is thus obtained even if the blowing time is prolonged. If this is done, however, the cohesive properties of the bitumen are impared. Low temperature ductility, and adhesion to critical minerals and miscibility with other binders are reduced.

We have recently discovered that bitumen extended by a suitable flux oil and blended with certain elastomers can be blown so that a homogeneous product of improved elasticity and hot storage stability results, without degrading the elastomer. This forms the basis of our British Pat. Specification No. 1,304,238 which corresponds to copending U.S. application Ser. No. 71,196.

The compositions prepared according to British Pat. Specification No. 1,304,238 are homogeneous and even when they are stored hot, little or no separation of the components takes place. They have marked elastic properties and are particularly suitable for use as sealing materials, pipe wrapping impregnating compounds and pipe lining compounds, for the production of bitumen paints, and insulating materials for the electrical engineering industry, for the production of elastic roofing felt and water proofing felt, and for heat and sound insulating materials. Their properties also render them suitable for use in road construction.

For the last mentioned purpose, however, only mixtures with a low copolymer content can be considered, for cost reasons. For the production of such mixtures according to the process of British Pat. Specification No. 1,304,238 long blowing times are necessary in order to achieve homogeneity which will be retained on hot storage. This has disadvantages in view of the large quantities required in roadmaking.

Our copending British Pat. Application No. 9284/72 which corresponds to copending U.S. application Ser. No. 231,023 claims a process for the production of a bituminous composition, which process comprises blending:

10 – 85% wt, based on the total mixture, of bituminous substance,

5 – 25% wt, based on the total mixture, of a copolymer of one or more mono alpha olefins and a cyclic olefin having an endocyclic bridge and at least two olefinic double bonds, 10 – 85% wt, based on the total mixture, of an aromatic flux oil, and 0 – 4 parts by weight sulphur per 100 parts polymer and blowing the blend at 150°-260°C with a gas which contains elemental oxygen to form a concentrate and dissolving the concentrate in unblown bitumen.

By means of this process it is possible in an economical manner to produce modified bituminous binders for roadbuilding which possess a high degree of homogeneity and also do not lose this after hot storage for a long time and processing in asphalt mixing plant.

However, it has been found that during the subsequent blowing of the modified binders obtained by blending the concentrates with bitumen or other bituminous substances, for the purpose of correcting certain properties (e.g. penetration or softening point) separation can occur from time to time.

Surprisingly it has now been found that such separation can be prevented if, for the production of the modified binder, a concentrate is prepared by blowing a mixture of a high-boiling hydrocarbon oil and an elastomeric co-polymer of one or more mono-alpha-olefins and an unsaturated hydrocarbon with more than one olefinic double bond and an endocyclic bridge comprising one or more methylene groups, with oxygen or a gas containing elemental oxygen at elevated temperature, and the concentrate is then mixed with unblown bitumen. During the production of the concentrate small quantities of sulphur may be added before, during or after the blowing operation. As a result of the addition of sulphur a further improvement in the elasticity of the modified bituminous binder can be achieved.

The homogeneous mixtures obtained by blending the concentrates with bitumen can be modified still further in regard to their properties by blowing without jeopardising their homogeneity.

The process according to the invention therefore can produce a wide variety of modified bituminous binders. The products obtained are useful not only because of their outstanding homogeneity, which is still retained after being stored hot for a fairly long time, but also because of their good flexibility and very good adhesion behaviour in relation to mineral additives.

Since, when further blowing homogeneous mixtures of concentrate and bitumen, the softening point rises more quickly than when blowing the initial mixtures, with or without bitumen, the total blowing time for the production of products of comparable properties in the process according to the present invention as compared with the process of British Patent Application No. 9284/72 is considerably shorter. This means that at the same time the thermal and oxidation stress on the copolymer is considerably reduced, which constitutes a further advantage.

It was also unexpectedly found that when blowing mixtures of the high-boiling hydrocarbon oil and the elastomeric copolymer the time required for the concentrates to become miscible with the bitumen to form homogeneous modified binders was from 2 to 6 hours shorter than in the case of concentrates according Patent No. 1304238 mentioned above, which in addition to the high-boiling hydrocarbon oil and the copolymer also contain bitumen.

Thus according to the present invention there is provided a process for the production of a bituminous composition, which process comprises blending 65 to 95% by weight of a high boiling hydrocarbon oil and 5 to 35 by weight of an elastomeric copolymer of one or more mono-alpha-olefins and an unsaturated hydrocarbon with more than one olefinic double bonds and an endocyclic bridge comprising one or more methylene groups, and blowing the mixture with oxygen or a gas containing elemental oxygen at a temperature in the range 150° to 260°C to form a concentrate, and dissolving the concentrate in unblown bitumen.

The concentration of elastomeric copolymer in the concentrate is preferably in the range 5 to 10% by weight.

Up to 10 parts, preferably 0.5 to 5 parts by weight of sulphur per 100 parts of elastomeric copolymer may be added.

When sulphur is employed, further improvements in elasticity and homogenuity are achieved. It may be added before, during or after the blowing.

The concentrate is preferably blown at a temperature in the range from 180° to 230°C.

The blend of concentrate and bitumen may be further blown, if desired, at a temperature in the range 150° to 260°C, preferably 180° to 230°C.

The high boiling hydrocarbon oils most suitable for use in the process according to the invention are those known in the petroleum industry as "aromatic extracts." These are the fractions produced by treating vacuum distillates and de-asphalted vacuum residues with solvents selective for the aromatic components. The solvents commonly used include furfural, sulphur dioxide and phenol.

Aromatic extracts obtained during the production of lubricating oils are particularly suitable.

High boiling coal tar fractions are also suitable, however.

Preferably the copolymer contains units derived from both ethylene and propylene. The preferred cyclic olefins are dicyclopentadiene and ethylidene norbornene.

The high boiling hydrocarbon oil is suitably mixed with the copolymer by milling at a temperature in the range 90° to 150°, preferably about 100°C. Alternatively an aqueous emulsion (latex) of the copolymer may be added to pre-heated oil.

Suitably 5–100, preferably 50–100, parts by weight of concentrate are mixed with 100 parts by weight bitumen, for example by stirring, suitably at a temperature in the range 150°–260°C, preferably 180°–230°C.

The bitumen is preferably a vacuum residue derived from a Venezuelan or Middle East crude oil.

The blowing time for the concentrates necessary for obtaining a durable homogeneity of the end products is normally from 7 to 15 hours. It depends on the nature of the high-boiling hydrocarbon oil, on the blowing conditions, on the type and consistency of the bituminous substances used for the blending and also on the proportion of the components.

In any special case, however, it is possible to tell by simple laboratory methods whether the concentrate has been blown for a sufficiently long period.

If after blending a sample of the blown concentrate with the quantity of unblown bitumen or required for a given end concentration of copolymer the resultant blend separates or still appears heterogeneous under the microscope, the blowing of the concentrate was still not sufficient and must be continued. If homogeneity is found under the microscope with a sample of mixture, the concentrate is preferably blown for a further 1 to 2 hours before the contents of the vessel are mixed with the quantity of bituminous material which is to be modified corresponding to the desired end concentration of elastomeric copolymer.

If desired the mixture obtained by blending the blown concentrate with the bituminous material is further blown with air or another gas containing elemental oxygen at temperatures in the range from 150° to 260°C, preferably in the range from 180° to 230°C, for the purpose of adjusting desired values of certain properties. (e.g. penetration or softening point).

The invention is illustrated by the following Examples. Examples 2, 4, 6 and 8 are provided for purposes of comparison only and are not in accordance with the invention.

EXAMPLE 1

4 kgs. of mixture comprising:

| | |
|---|---|
| Medium extract | 94% by wt. |
| EPDM rubber | 6% by wt. | were heated in a vessel to 220°C.

Air was then blown in at a rate of 1.7 cu.m. per hr. At the same time 4.8 g of sulphur were added (2 parts by wt. to 100 parts by wt. of copolymer).

The medium extract was obtained by furfural extraction of a viscous lubricating oil basestock. It has the following physical data:

| | |
|---|---|
| Density at 15°C | 0.9999 g/cm³ |
| Viscosity at 50°C | 650 cSt |
| Viscosity at 100°C | 35 cSt. |

The EPDM rubber was a commercial co-polymer of ethylene, propylene and dicyclopentadiene with a Mooney viscosity of 50.

At the commencement of the blowing the mixture had a softening point (ball and ring) of 27°C. Samples were taken from the vessel every hour. The samples of the concentrate were blended with a bitumen B 200 (DIN 1995) processed from Iranian crude in a proportion by weight of 1:2. The products obtained all contained 2% by weight of copolymer.

After a blowing time of 5 hours the concentrate had a softening point of 35°C. By mixing with B 200 it was now possible to obtain a homogeneous modified bitumen (2% by weight of copolymer) with a softening point of 36°C. The homogeneity of the product was not lost even when it was stored hot for some time.

A part of the homogeneous mixture was blown at 210°C with air blown in at the rate of 0.42 cu.m./hr.kg. The following Table 1 shows the change in the softening point according to the duration of blowing:

Table 1

| Blowing time (hrs.) | 0 | 1 | 2 | 3 | 4 | 5 | 6 |
|---|---|---|---|---|---|---|---|
| Softening point, ball and ring(°C) | 36 | 40 | 43 | 46 | 50 | 53 | 56 |

It was therefore possible to raise the softening point of the mixture by blowing without imperilling its homogeneity.

EXAMPLE 2

Example 1 was repeated with a mixture of the following composition:

| | |
|---|---|
| Medium extract | 84% by wt. |
| Bitumen B 200 | 10% by wt. |
| EPDM rubber | 6% by wt. |

The bitumen B 200 (DIN 1995) originated from the processing of Iranian Crude.

Sulphur was added to the mixture at the commencement of blowing in a quantity of 2 parts by weight, reckoned on 100 parts by weight of rubber.

At the beginning of the blowing the mixture had a ball and ring softening point of 27°C. Homogeneous miscibility of the concentrate with bitumen B 200 in the production by weight of 1:2 was not possible until after 7 hours blowing (as compared with 5 hours in Example 1). After this blowing time the concentrate showed a ball and ring softening point of 35°C; the homogeneous mixture with a content of copolymer of 2% by weight showed a ball and ring softening point of 35.5°C.

A part of the homogeneous mixture was blown with air at the rate of 0.42 cu.m./hr.kg. at 210°C. The following Table 2 shows the change in the softening point according to the duration of blowing:

Table 2

| Blowing time (hrs.) | 0 | 1 | 2 | 3 |
|---|---|---|---|---|
| Ball and ring softening point (°C) | 35.5 | 40 | 44 | 49 |

After a blowing time of 3 hours separation of the mixture took place. In Example 1 (process according to the invention) in which the original mixture for the concentrate which consisted only of the high-boiling hydrocarbon oil and the EPDM rubber it was possible to continue to blow the homogeneous product obtained after mixing the concentrate with B 200 and in this way to reach a softening point of 56°C without any separation being observed.

EXAMPLE 3

Example 1 was repeated with the difference that the concentrate was blended with a bitumen B 80 (DIN 1995) instead of a bitumen B 200. The B 80 originated from the processing of Iranian Crude.

Homogeneous miscibility of the concentrate with the B 80 in a proportion by weight of 1:2 was reached after a blowing time of the concentrate of 13 hours. After this boiling time the concentrate had a softening point of 38°C and the homogeneous mixture with B 80 had a softening point of 42°C.

EXAMPLE 4

Example 2 was repeated with the difference that the concentrate was derived from a B 80 (DIN 1995) bitumen and was blended with a B 80 instead of a B 200.

Homogeneous miscibility of the concentrate with the B 80 in a proportion by weight of 1:2 was reached only after a blowing time of the concentrate of 15 hours (in Example 3 — 13 hours). The concentrate after blowing for 15 hours had a softening point of 38°C and the homogeneous mixture with B 80 had a softening point of 40°C.

The comparison of Example 4 with Example 3 (process according to the invention) shows that it is advantageous for the production of the modified bituminous mixtures to use an initial mixture which consists only of the high-boiling hydrocarbon oil and the co-polymer.

EXAMPLE 5

4 kg. of a basic mixture of the composition:

| | |
|---|---|
| Medium extract | 90% by wt. |
| EPDM rubber | 10% by wt. | were heated in a flask to 220°C.

Air was then introduced at the rate of 1.7 cu.m./hr. At the same time 8.0 g of sulphur were added (2 parts by weight to 100 parts by weight of elastomer).

The medium extract had the properties shown in Example 1. The EPDM rubber was a commercial co-polymer of ethylene, propylene and dicyclopentadiene with a Mooney viscosity of approximately 30.

Initially the mixture had a ball and ring softening point of 29°C. Samples were taken from the vessel every hour. The samples of the concentrate were blended with a bitumen B 200 (DIN 1995) from the processing of Iranian Crude in a proportion by weight of 1:4. The products obtained in each case contained 2% by weight of elastomer.

After 7 hours' blowing time the concentrate had a ball and ring softening point of 28°C. By blending with B 200 it was now possible to obtain a homogeneous modified bitumen (2% by weight copolymer) with a ball and ring softening point of 35°C. The homogeneity of the product was not lost even when it was stored hot for an extended period.

EXAMPLE 6

Example 5 was repeated with mixture of the following composition:

| Medium extract | 80% by weight |
| Bitumen B 200 | 10% by weight |
| EPDM rubber | 10% by weight |

The bitumen B 200 (DIN 1995) originated from the processing of Iranian Crude.

Sulphur was initially added to the mixture in a quantity of 2 parts by weight, reckoned on 100 parts by weight of rubber.

At the commencement of the blowing the mixture had a ball and ring softening point of 30°C. Homogeneous miscibility of the concentrate with bitumen B 200 in a proportion by weight of 1:4 was not reached until after a blowing time of 12 hours (as compared with 7 hours in Example 5 using the process according to the invention). After this blowing time the concentrate had a ball and ring softening point of 36°C. The homogeneous mixture with a content of copolymer of 2% by weight had a ball and ring softening point of 37°C.

EXAMPLE 7

Example 5 was repeated with the difference that the concentrate was blended with a bitumen B 80 (DIN 1995) from the processing of Iranian Crude instead of a bitumen B 200.

Homogeneous miscibility of the concentrate with the B 80 in a proportion by weight of 1:4 was only achieved after blowing the concentrate for 13 hours. The concentrate after this blowing time showed a ball and ring softening point of 30°C and the homogeneous mixture with B 80 showed a ball and ring softening point of 43°C. The homogeneity of this product was also not lost when it was stored hot for a fairly long time.

EXAMPLE 8

Example 6 was repeated with the difference that the concentrate of Example 6 was blended with a B 80 (DIN 1995) from the processing of Iranian Crude instead of a bitumen B 200.

Homogeneous miscibility of the concentrate with the B 80 in a proportion by weight of 1:4 was not possible until after a blowing time of 18 hours (as compared with 13 hours in Example 7 using the process according to the invention). After this blowing time the concentrate had a ball and ring softening point of 42°C; the homogeneous mixture with copolymer content of 2% by weight had a softening point of 44°C.

We claim:

1. A process for the production of an asphaltic composition, which comprises
   1. forming a mixture of:
      5–35% by weight, based on the total mixture of an elastomeric copolymer of ethylene, propylene and an cyclic olefin having more than one olefinic double bond and an endocyclic bridge comprising one or more methylene groups,
      65–95% by weight, of a high boiling hydrocarbon oil which is an aromatic extract from lubricating oil or high boiling coal tar fractions,
   2. blowing the mixture at 150° to 260°C with a gas which contains elemental oxygen to form a concentrate, and
   3. dissolving said concentrate in unblown asphalt which is a distillation residue derived from crude oil.

2. The process according to claim 1 wherein the concentration of the elastomeric copolymer in the concentrate is in the range 5 to 10% by weight.

3. The process according to claim 1 wherein up to 10 parts by weight sulphur per 100 parts of elastomeric copolymer are added.

4. The process according to claim 3 wherein 0.5 to 5 parts by weight of sulphur per 100 parts of copolymer are added.

5. The process according to claim 1 wherein the aromatic extract is derived by treating a vacuum distillate or a deasphalted vacuum residue with furfural.

6. The process according to claim 1 wherein the copolymer is a copolymer of ethylene, propylene and dicyclopentadiene.

7. The process according to claim 1 wherein the high boiling hydrocarbon oil is mixed with the copolymer by milling at a temperature in the range of 90° to 150°C.

8. The process according to claim 1 wherein 5–100 parts by weight of concentrate are mixed with 100 parts by weight of asphalt.

9. The process according to claim 8 wherein 50–100 parts by weight of concentrate are mixed with 100 parts by weight of asphalt.

10. The process according to claim 1 wherein the concentrate is mixed with the asphalt at a temperature in the range 150° to 260°C.

11. The process according to claim 10 wherein the concentrate is mixed with the asphalt at a temperature in the range 180° to 230°C.

12. The process according to claim 1 wherein the asphalt is a vacuum residue derived from a Middle East crude oil.

13. The process according to claim 1 wherein the blend obtained by dissolving the concentrate in the asphalt is further blown with air or another gas containing elemental oxygen at a temperature in the range 150° to 260°C.

14. The process according to claim 13 wherein the temperature at which the blend is further blown is in the range 180° to 230°C.

15. The process of claim 1 wherein the unsaturated hydrocarbon is ethylidene norbornene.

16. The product produced by the process defined in claim 1.

* * * * *

UNITED STATES PATENT AND TRADEMARK OFFICE
CERTIFICATE OF CORRECTION

PATENT NO. : 3,873,483
DATED : March 25, 1975
INVENTOR(S) : Manfred Wolfgang Oelsner & Erich Gunther Zenke It is certified that error appears in the above-identified patent and that said Letters Patent are hereby corrected as shown below:

In the title and at Column 1, line 2, each occurrence, "ELASTIC" should be --ELASTOMERIC--.
At Column 1, line 16, "leaser" should be --lesser--.
At Column 3, line 41, "35" should be --35%--.
At Column 4, lines 48-49, "oxgygen" should be --oxygen--.
At Column 5, line 59, "production" should be --proportion--.
At Column 6, line 28, "boiling" should be --blowing--.

Signed and Sealed this thirteenth Day of April 1976

[SEAL]

Attest:

RUTH C. MASON
Attesting Officer

C. MARSHALL DANN
Commissioner of Patents and Trademarks